US012743953B2

(12) United States Patent
Jamnicki

(10) Patent No.: US 12,743,953 B2
(45) Date of Patent: Sep. 22, 2026

(54) ASSIST SYSTEM FOR A MOTOR VEHICLE

(71) Applicant: Ford Global Technologies, LLC, Dearborn, MI (US)

(72) Inventor: Paul Jamnicki, Bonn (DE)

( * ) Notice: Subject to any disclaimer, the term of this patent is extended or adjusted under 35 U.S.C. 154(b) by 0 days.

(21) Appl. No.: 19/075,935

(22) Filed: Mar. 11, 2025

(65) Prior Publication Data

US 2025/0322750 A1 Oct. 16, 2025

(30) Foreign Application Priority Data

Apr. 16, 2024 (DE) ......................... 102024110565.8

(51) Int. Cl.
*G08G 1/14* (2006.01)

(52) U.S. Cl.
CPC .................................... *G08G 1/143* (2013.01)

(58) Field of Classification Search
CPC .......... G08G 1/143; G08G 1/168; G08G 1/16; G08G 1/165; G08G 1/166; G01S 2015/935; B60W 50/14; B60W 40/02; B60W 2420/403; B60W 2420/408; B60W 2420/54; B62D 15/027; B62D 15/028; B62D 15/0285; B60Q 9/007
See application file for complete search history.

(56) References Cited

U.S. PATENT DOCUMENTS 7,786,896 B2 * 8/2010 Schmid .................. G08G 1/161 340/436
2005/0122234 A1 * 6/2005 Danz ....................... G01S 15/87 340/932.2
2006/0139181 A1 * 6/2006 Danz ...................... B60Q 9/007 348/148
2010/0156671 A1 * 6/2010 Lee ........................ G08G 1/168 340/932.2
2010/0183159 A1 * 7/2010 Clot .......................... H04S 7/30 701/532
2018/0324532 A1 * 11/2018 Kukla ..................... H04S 7/304
(Continued)

FOREIGN PATENT DOCUMENTS

DE 102004001122 A1 1/2004
DE 10257722 A1 7/2004
DE 102015221361 A1 * 5/2017 ............... G08G 1/16
(Continued)

*Primary Examiner* — Adnan Aziz
(74) *Attorney, Agent, or Firm* — Frank Lollo; Eversheds Sutherland (US) LLP

(57) ABSTRACT

The invention relates to an assist system (1) for a motor vehicle (20), having a parking sensor arrangement (2), an acoustic system (5) for a vehicle interior (21), and a control unit (10), wherein the control unit (10) is designed to detect at least one parking space (30, 32, 34) by means of the parking sensor arrangement (2), to indicate this parking space via an acoustic signal (A) by means of the acoustic system (5) and to determine a parking space direction (P1, P2, P3). In order to optimize the assistance to a driver in locating a parking space, it is provided according to the invention that the control unit (10) is designed to set a virtual direction of origin (R1, R2, R3) of the acoustic signal (A) that can be perceived in a listening position (25) within the vehicle interior (21), the virtual direction of origin being set relative to the listening position (25) and according to the parking space direction (P1, P2, P3).

10 Claims, 6 Drawing Sheets

(56) References Cited

U.S. PATENT DOCUMENTS

| | | | | |
|---|---|---|---|---|
| 2020/0189614 | A1* | 6/2020 | Ito | B60W 30/0956 |
| 2025/0076067 | A1* | 3/2025 | Krüger | A61B 5/024 |

FOREIGN PATENT DOCUMENTS

| | | | | |
|---|---|---|---|---|
| DE | 102019210554 | A1 * | 1/2021 | B60Q 9/007 |
| EP | 1686007 | A2 | 8/2006 | |
| EP | 2130736 | B1 | 12/2009 | |
| EP | 2557020 | A2 | 2/2013 | |
| EP | 2608185 | A1 | 11/2014 | |

* cited by examiner

ASSIST SYSTEM FOR A MOTOR VEHICLE

CROSS-REFERENCE TO RELATED APPLICATIONS

The present application claims priority to and the benefit of German Application No. 102024110565.8, filed on Apr. 16, 2024, which is hereby incorporated by reference herein in its entirety.

FIELD

The invention relates to an assist system for a motor vehicle.

BACKGROUND

In modern motor vehicles, in particular in cars, parking assist systems are known, which detect an available parking space using sensors and indicate this to the driver, for example via a graphic display and/or a signal tone. The parking space is measured automatically by the assist system and compared with the dimensions of the motor vehicle. The assist system may furthermore assist the driver via instructions when parking or it may possibly also control the vehicle entirely or partly autonomously when parking. Depending on the capability of the sensors, the parking space found may be some distance from the current position of the motor vehicle. It is also possible that its position in a parking area, at the side of a road or the like is unclear or that the driver has to direct his attention to the flowing traffic, to pedestrians or the like. In all of these cases, it is sometimes difficult for the driver to easily locate the parking space found by the assist system. Also, multiple parking spaces may be found by the system, in which case the driver must choose which one of them to use. Systems are known which display the position of the parking space graphically on a screen. If there are multiple parking spaces, a recommendation for the most suitable parking space may be displayed. However, reading the corresponding displays and matching them to the environment of the motor vehicle is, again, a distraction for the driver.

DE 102 57 722 A1 discloses a parking aid for a vehicle, having a measuring unit for detecting parking spaces when the vehicle is driving past the parking spaces, having a memory unit for storing properties of the parking spaces and having an output unit for outputting information relating to the parking spaces. The information may optionally also be output acoustically, in particular via a warning signal or a voice output.

DE 10 2004 001 122 A1 discloses a method for providing information for parallel parking a vehicle in relation to the road by determining the size and position of a parking space, determining the vehicle position relative to the parking space, calculating a setpoint trajectory and generating signals for identifying the remaining distance to the next stopping point of the vehicle. According to one configuration, a setpoint steering direction to the right or left in relation to the longitudinal axis of the vehicle is represented by acoustic signals which come from a speaker arranged in the right or left half of the vehicle in relation to the longitudinal axis of the vehicle.

From EP 1 686 007 A2, a method is known for the acoustic output of information, in particular in a vehicle, wherein a degree of criticality of the information is ascertained, wherein the acoustic output is realized by at least one polyphonic sound or sound sequence and wherein the harmony of the sound or the sound sequence is selected according to the criticality of the information. In particular, information relating to a parking space length may be output, wherein the criticality of the information increases as the parking space length decreases.

EP 2 130 736 B1 discloses an assist system with environment recognition. This displays a distance marking, a multiplicity of route assessment lines and a multiplicity of reference distance lines on a monitor, wherein the route assessment lines and the reference distance lines are displayed as parking guidance. Furthermore, objects situated around the user in the predetermined area indicated by the distance marking are detected and a particular sound is emitted, which corresponds to the distance indicated by the distance marking.

EP 2 557 020 A2 discloses a method for assisting a driver of a vehicle during a parking procedure. In this, environment data characterizing the environment of the vehicle are provided and are evaluated in relation to at least a first object in a lateral environment of the vehicle, which indicates a potential parking space, and in relation to at least a second object outside the lateral environment of the vehicle, which confirms the presence of the parking space. The available parking space is indicated, which may optionally be realized acoustically.

From EP 2 608 185 A1, a method for providing a parking aid in a vehicle is known, in which at least one parking space is detected in the environment of the vehicle and the environment of the vehicle is displayed with the least one parking space via a graphic representation. At least two parking modes are defined, which differ in terms of the manner of parking in the parking spaces and/or in the type of parking space, and one of the parking modes is selected, wherein the type of graphic representation of the environment and the parking space is dependent on the selected parking mode.

With regard to the demonstrated prior art, the assistance for a driver in locating a parking space still has room for improvement. Particularly desirable is intuitively understandable assistance which distracts the driver as little as possible.

SUMMARY

The invention is based on the object of optimizing the assistance for a driver in locating a parking space.

According to the invention, the object is achieved by an assist.

It should be pointed out that the features and measures listed individually in the description below may be combined with one another in any technically meaningful manner and demonstrate further configurations of the invention. The description additionally characterizes and specifies the invention in particular in conjunction with the figures.

An assist system for a motor vehicle is provided by the invention. The term “motor vehicle” here refers in a narrower sense to a road vehicle, i.e. a vehicle which is suitable and authorized for road travel. In particular, this may be a car, a truck or a bus. In terms of the drive of the motor vehicle, there are no restrictions; it may be driven, for example, by an internal combustion engine which uses petrol, diesel, LPG, hydrogen or another gas as fuel. Alternatively or additionally, an electric motor may be provided, which may be supplied with energy by a battery unit and/or a fuel cell, for example. The motor vehicle preferably has at least two axles, each having two wheels, although deviations from this are also conceivable. The motor vehicle may be at least periodically controllable by a driver. However, it may also be designed to be at least periodically driven autonomously, i.e. without being controlled by a driver. The assist system serves to assist one or more occupants of the motor vehicle, in particular a driver. It may also be referred to as a parking assist system.

The assist system has a parking sensor arrangement, an acoustic system for a vehicle interior, and a control unit. The parking sensor arrangement has at least one sensor, which may also be referred to as a parking sensor. It is often a contactless sensor, i.e. an optical, ultrasonic, LiDAR or radar sensor. A combination of different sensors is also conceivable. The acoustic system is provided for the vehicle interior and may be arranged at least partially within the vehicle interior or adjacent to the vehicle interior. It is designed to generate sound. In addition to at least one element for sound generation, it may also have at least one element for influencing sound. The latter may be designed, for example, to distribute, focus or reflect sound, or suchlike. The control unit may execute control functions on the one hand and evaluation functions on the other. It does not have to be exclusively associated with the assist system. For example, it may be an on-board computer of the motor vehicle, which is also associated with other systems of the motor vehicle. The term "unit" should not be interpreted to mean that all parts of the control unit must be physically cohesive and/or arranged in one place. It may also have a multiplicity of elements or sub-units, which may be connected to one another, for example via data lines. The control unit may also be referred to as a controller. It often has hardware components, although at least some of its functions may be implemented using software. The control unit is connected to both the parking sensor arrangement and the acoustic system for signal transmission. The connection may be, in particular, a wired connection, although a wireless connection is also possible.

The control unit here is designed to detect at least one parking space by means of the parking sensor arrangement, to indicate this parking space via an acoustic signal by means of the acoustic system and to determine a parking space direction. The control unit receives sensor signals or sensor values from the parking sensor arrangement and, on the basis of these signals, may detect whether a parking space is available. The term "parking space" in this context refers to an area which, in terms of its dimensions, is at least large enough to park the motor vehicle therein. The parking space should expediently be larger than the dimensions of the motor vehicle in order to enable the motor vehicle to be maneuvered therein or to allow the vehicle doors to be opened. The parking space may be characterized by a longitudinal direction and a transverse direction which, in the case of a parked motor vehicle, correspond to a longitudinal axis (X axis) and a transverse axis (Y axis). It goes without saying that the parking space must be open along at least one side in at least one of the directions in order to enable parking. If the control unit has detected a parking space, it indicates this via an acoustic signal by means of the acoustic system. The acoustic signal may be generated immediately following the detection of the parking space or after a certain time delay. In terms of the type of acoustic signal, many different options fall within the scope of the invention. It may refer to an individual continuous tone or a sequence of intermittent tones. The acoustic signal may contain one or more frequencies, wherein the frequency may also be altered over time; it may therefore become higher or lower over time. Finally, the acoustic signal may also comprise a voice output which contains information that is immediately understandable for the occupants, e.g. "parking space found" or the like.

The control unit is also designed to determine a parking space direction. This generally refers to a direction in which the parking space is arranged. More precisely, it refers to a direction in which the parking space is arranged relative to the motor vehicle. In general, this may be a direction in which at least one point or partial area of the parking space is arranged as seen from a point or partial area of the motor vehicle. The parking space direction may be given, for example, in degrees, where 0° might correspond to a direction along the longitudinal action straight ahead of the vehicle, 90° might correspond to a direction along the transverse direction to the right of the vehicle etc. Other units, which are possibly merely used internally by the control unit, are also conceivable. The determination of the parking space direction may be based on the determination of a parking space position. The parking space position here describes a position of the parking space relative to the motor vehicle.

According to the invention, it is provided that the control unit is designed to set a virtual direction of origin of the acoustic signal that can be perceived in a listening position within the vehicle interior, the virtual direction of origin being set relative to the listening position and according to the parking space direction. The listening position within the vehicle interior may be defined more or less precisely and may possibly also be referred to as a listening area. The listening position may be defined three-dimensionally; however, a two-dimensional definition relative to the longitudinal axis and the transverse axis of the motor vehicle is generally sufficient. It corresponds to the position of an occupant for whom it is assumed that the acoustic signal is relevant. The listening position may be either predetermined from the outset or it may be ascertained depending on the situation, in particular by the control unit. The control unit is designed to set the virtual direction of origin of the acoustic signal. The term "virtual direction of origin" here refers to a direction from which the acoustic signal appears to originate according to a listener in the listening position, i.e. the direction in which the listener would place the origin of the acoustic signal. In some situations, this may correspond to an actual direction of the signal generator, i.e. a signal generator position; however, the acoustic system generally merely generates the impression that the acoustic signal is coming from this direction. This is indicated by the term "virtual". Hereinafter, the term "direction of origin" may simply be used, which should be equated with the term "virtual direction of origin".

The virtual direction of origin is set according to the parking space direction. In general, this means that different directions of origin are set for different parking space directions. However, this does not mean that each change in the parking space direction also corresponds to a change in the direction of origin. At the least, two parking space directions, which differ from one another at least by a certain angle value (e.g. 10°, 20° or 45°, and possibly more), lead to different settings for the direction of origin. Therefore, the direction of origin contains information relating to the parking space direction in each case. It goes without saying that there should preferably be an intuitively understandable association between the two directions. In any case, an occupant, in particular the driver, may not only detect the presence of a parking space based on the acoustic signal but will also be assisted in the locating thereof. Since this takes place via the acoustic signal, the occupant does not need to read from a screen or other display and may instead devote his attention to the environment of the vehicle. It goes without saying that, in addition to the acoustic signal, the assist system may also use a graphic representation in order to inform the occupant(s) of the presence, position and/or configuration of a parking space.

In some embodiments, the association between the direction of origin and the parking space direction may be given as a loose or approximate association. In this regard, it would be conceivable for the direction of origin to be set to the right or left of the listening position when the parking space is located to the right or left of the motor vehicle. Equally, the direction of origin might simply indicate whether the parking space is located in front of or behind the motor vehicle. A rough division into quadrants (front left, front right, rear left, rear right) would also be conceivable. However, a preferred configuration provides that the control unit is designed to set the direction of origin in such a way that it deviates by a maximum of 45°, preferably by a maximum of 20°, further preferably by a maximum of 10°, from the parking space direction. A comparatively precise orientation relative to the parking space direction is therefore given for a person in the listening position. It goes without saying that the deviation of the direction of origin from the parking space direction depends on various factors, e.g. on the precision with which the parking space direction and the listening position are determined, or the precision (e.g. increments in degrees) with which the direction of origin can be set.

In particular, in an at least periodically autonomously driven vehicle, a person for whom the parking space direction is relevant may be located in different areas of the vehicle interior. If the motor vehicle is not driven autonomously, the driver is often the person who should be informed about the parking space direction. It is therefore preferred that the listening position corresponds to an assumed driving position of a driver. The driving position may possibly be ascertained via sensors. However, it would also be conceivable to assume as standard that the position of a driver's seat represents the driving position. The driving position may be defined more or less precisely. Ideally, this should be based on the position of the driver's head. It may also depend on the specific settings of an adjustable driver's seat, which may be taken into account when ascertaining the driving position/listening position.

To influence the direction of origin, different acoustic methods are conceivable. In this regard, for example, the distribution and/or reflection of sound waves within the vehicle interior may be dynamically altered. According to a preferred configuration, the acoustic system has a multiplicity of sound generators, wherein the control unit is designed to set the direction of origin through individual adjustment of the output volume of the acoustic signal at the individual sound generators. The term "sound generator" here refers to any component which may generate and output sound in a controllable manner. In particular, the sound generators may be speakers. These may belong to an infotainment system of the motor vehicle, for example. The sound generators occupy different positions within the vehicle interior. In particular, at least two sound generators may be spaced apart relative to the longitudinal axis and/or the transverse axis of the motor vehicle. They are advantageously arranged on mutually opposite sides of the vehicle interior. Although approximate directional information is possible using two sound generators, for example, it is preferred that the acoustic system has at least four sound generators, which are spaced in pairs along the longitudinal axis and/or the transverse axis. That is to say they may be arranged on the front left and right and the rear left and right of the vehicle interior. The output volume of the respective sound generator is set individually by the control unit. If the output volume of at least one front sound generator is increased relative to the output volume of at least one rear sound generator, this shifts the direction of origin forwards. If the output volume of at least one right sound generator is increased relative to the output volume of at least one left sound generator, this shifts the direction of origin to the right. A particular direction of origin may possibly be represented with greater precision through a particular ratio of the output volumes.

The listening position may be fixed by the control unit. For example, the position of the driver may be assumed to be unalterable owing to the configuration of the motor vehicle. It would also be conceivable to identify the listening position on the basis of settings set by the user. For example, based on the setting of an infotainment system (in particular the balance), it may be inferred whether a listener (driver, passenger, etc.) is located on the left or right of the vehicle. Alternatively or in addition, it is preferred that the control unit is designed to determine the listening position by means of an interior sensor arrangement associated with the vehicle interior. The interior sensor arrangement has at least one sensor, which may be used for detection within the vehicle interior and which may itself be arranged, in particular, in or at least adjacent to the vehicle interior. One option would be seat cover sensors via which the position of one or more occupants could be established. It would also be possible to detect occupants in a contactless manner, e.g. optically, via interior cameras, via radar, via LiDAR or via ultrasound. Various sensors or detection methods may also be combined. For example, the listening position relative to the vehicle transverse axis may be established by the fixed position of the driver's seat relative thereto. The relevant position of the driver's head may be estimated approximately via the current position of the seat relative to the vehicle longitudinal axis, the setting of the backrest and/or other parameters. These settings may be detected directly if they are set using actuators. In addition or alternatively, however, such settings may also be detected by sensors, which may be referred to as position encoders.

On the part of the motor vehicle, different areas or points may be used as a reference for determining the parking space direction. For example, the parking space direction may be determined in relation to a central position of the motor vehicle relative to the longitudinal axis and transverse axis. Information which is particularly intuitively understandable is provided if the control unit is designed to determine the parking space direction relative to the listing position. That is to say it is ascertained in which direction the parking space is located as seen from the listening position. If the direction of origin and the parking space direction correspond to a sufficient extent, the occupant in the listening position hears the acoustic signal approximately or exactly from the direction in which he is also able to see the parking space, provided it isn't concealed.

If the parking space is relatively far away from the motor vehicle, it may be seen in its entirety as approximately "dot-shaped", so that a single parking space direction may be approximately associated with the entire parking space. As soon as the distance from the parking space is smaller, i.e. less than a fifth or less than a third of the parking space length, different points or areas of the parking space may be distinguished in terms of their direction. According to one embodiment, the control unit is designed to determine the parking space direction as the direction of a reference point in the parking space. In terms of the positioning of the reference point within the parking space, various options are provided. This reference point may be arranged centrally in the parking space, wherein it goes without saying that exact mathematical and geometrical determination of a center of the parking space is not really feasible or useful. That is to say the reference point may be seen as “central” if it is arranged within a central fifth or a central tenth relative to the longitudinal extent and the transverse extent of the parking space, for example. Alternatively, the reference point may also be shifted forwards relative to a direction of travel of the motor vehicle. The “direction of travel” here is the direction in which the front of the vehicle faces when the motor vehicle is parked in the parking space. Based on the current alignment of the motor vehicle, the control unit is able to infer in which orientation the driver will presumably park the motor vehicle. In particular, it may be assumed that the orientation will deviate by less than 90° from the current orientation of the vehicle. In most motor vehicles, the forwardly shifted arrangement of the reference point corresponds to a position of the driver when the motor vehicle is parked. That is to say, the driver may receive intuitively understandable feedback relating to how the motor vehicle is positioned in relation to the intended parking position, in particular in the end phase of the parking procedure. Whilst the shift in the direction of travel indicates a displacement in the longitudinal direction of the parking space, a displacement in the transverse direction is also conceivable. For example, possibly in addition to a longitudinal displacement, the reference point may be shifted laterally to an approach side of the motor vehicle. “Laterally” here means in the transverse direction of the parking space. The approach side is the side, relative to the transverse direction, from which the motor vehicle approaches the parking space. If the parking space is located at the side of a road, the approach side faces the road.

Essentially, the assist system might indicate a parking space via a single acoustic signal. It would also be conceivable that the indication is repeated, with the direction of origin remaining unchanged. This may be sufficient, depending on the situation—for instance, if the motor vehicle is not moving or is only moving slightly. However, a preferred configuration provides that the control unit is designed to update the direction of origin upon a change in the parking space direction. That is to say the control unit is designed, on the one hand, to establish a change in the parking space direction. This may be realized through re-detection of the parking space. However, it would also be possible to calculate the current position of the parking space from the original position and the movement of the motor vehicle which has taken place in the meantime, from which the current parking space direction may be inferred again. A person in the listening position may hear how the direction of origin has changed during the movement of the motor vehicle. Compared to a stationary acoustic signal, this may possibly further facilitate the locating of the parking space.

The position of the respective parking space may be characterized by direction and distance. In some situations, directional information may be sufficient for guidance; in other situations, distance information may at least be helpful, e.g. if the parking space is further away and/or currently concealed. In a further possible configuration, the control unit may be designed to set the acoustic signal according to the parking space distance. The parking space distance here may be the distance between any point of the parking space and any point of the motor vehicle. In particular, the above-mentioned reference point in the parking space may be used as the basis for this, and/or the listening position. In terms of the distance-dependent setting, there are various options. For example, it would be possible to set the overall volume of the acoustic signal, wherein, in particular, the overall volume may increase as the parking space distance decreases. It would also be conceivable to set a pitch of the acoustic signal, i.e. in such a way that the pitch increases as the parking space distance decreases. A further option would be for the acoustic signal to consist of a series of intermittent individual tones, wherein the time interval between the individual tones likewise decreases as the parking space distance decreases. It would also be conceivable that the acoustic signal contains a voice output, which provides information relating to the specific parking space distance.

According to an advantageous configuration, the control unit is designed to detect a multiplicity of parking spaces and to indicate each parking space via at least one acoustic signal. That is to say, in a situation in which multiple parking spaces are available, these are detected and acoustically indicated. The control unit determines, for each parking space, a parking space direction associated therewith and possibly the parking space distance. A separate acoustic signal may be associated with each parking space, or a single acoustic signal may be generated, which contains partial signals for each parking space. Some or all of the acoustic signals or partial signals may be output simultaneously, although this could be confusing. Alternatively, they may also be output at alternating times, making it easier to perceive them individually. It goes without saying that the same listening position should form the basis for all signals.

BRIEF DESCRIPTION OF THE DRAWINGS

Further advantageous details and effects of the invention are explained in more detail below with reference to exemplary embodiments illustrated in the figures, in which.

DETAILED DESCRIPTION

Equivalent parts are always denoted by the same reference signs in the various figures and are therefore generally only described once.

Figure 1:
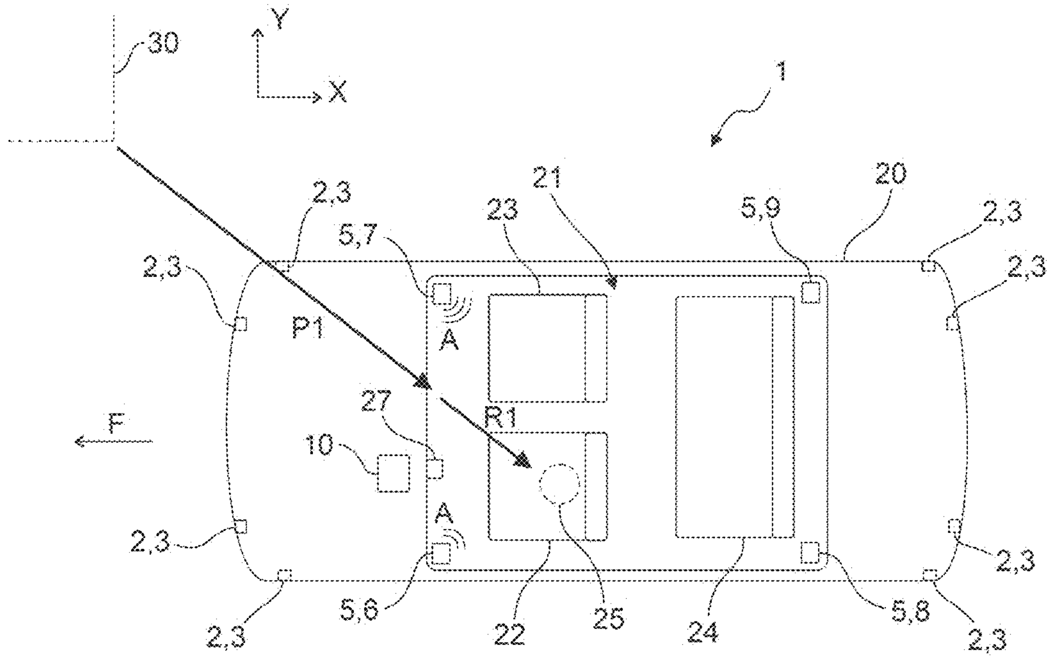
FIG. 1 shows a schematic plan view of a motor vehicle having an assist system according to the invention and part of a parking space.

FIG. 1 shows a motor vehicle 20, in this case a car. A longitudinal axis X, a transverse axis Y and a direction of travel F of the motor vehicle 20 are shown. The motor vehicle 20 has a vehicle interior 21, in which a driver's seat 22, a passenger seat 23 and a rear seat 24 are arranged. Four sound generators 6 to 9 of an acoustic system 5 are mounted within the vehicle interior 21 and are designed to generate an acoustic signal A. A multiplicity of parking sensors 3 of a parking sensor arrangement 2 are integrated in an exterior of the motor vehicle 20. These may be, for example, ultrasonic, radar and/or LiDAR sensors. The parking sensor arrangement 2 and the acoustic system 5 are connected to a control unit 10 via data lines (not illustrated) and, together with these parts, form an assist system 1 according to the invention. The control unit 10 is moreover connected to an interior sensor arrangement 27, e.g. a camera, with which at least part of the vehicle interior 21 may be monitored.

Part of a parking space 30 is likewise illustrated in FIG. 1. The control unit 10 is designed to detect this parking space 30 by means of the sensor arrangement 2. It then generates an acoustic signal A by means of the acoustic system 5. This indicates the presence of the parking space 30 to an occupant (not illustrated) of the motor vehicle 20. In addition, the acoustic signal A contains further information. From the ascertained position of the parking space 30 relative to the motor vehicle 20, the control unit ascertains a parking space direction P1 and the parking space distance. Through individual adjustment of the output volume of the acoustic signal A at the individual sound generators 6 to 9, the control unit 10 influences a virtual direction of origin R1 of the acoustic signal A. This is the direction from which the acoustic signal A appears to originate for an occupant located in a listening position 25. The listening position 25 should correspond to the position of the driver's head and may be ascertained by means of the interior sensor arrangement 27. In addition or alternatively, the listening position may also be at least approximately determined from the current position of the driver's seat 22, including the position of its backrest, for example.

The parking space direction P1 here is ascertained in relation to the established listening position 25. The control unit 10 sets the direction of origin R1 so that it deviates by a maximum of 10° from the parking space direction P1. Accordingly, the driver in the listening position 25 hears the acoustic signal A at least approximately from the same direction as that in which the parking space 30 is located as seen from his position. To this end, according to the situation in FIG. 1, in which the direction of origin R1 is to the front right, the acoustic signal A is qualitatively generated by only a front left sound generator 6 and a front right sound generator 7, wherein the volume of the front right sound generator 7 is greater than that of the front left sound generator 6. In addition, the acoustic signal A may be set according to the parking space distance. For example, a pitch, an overall volume or a time interval between individual tones may be altered depending on the distance. A voice output may also be realized, which indicates the specific distance.

Figure 2:
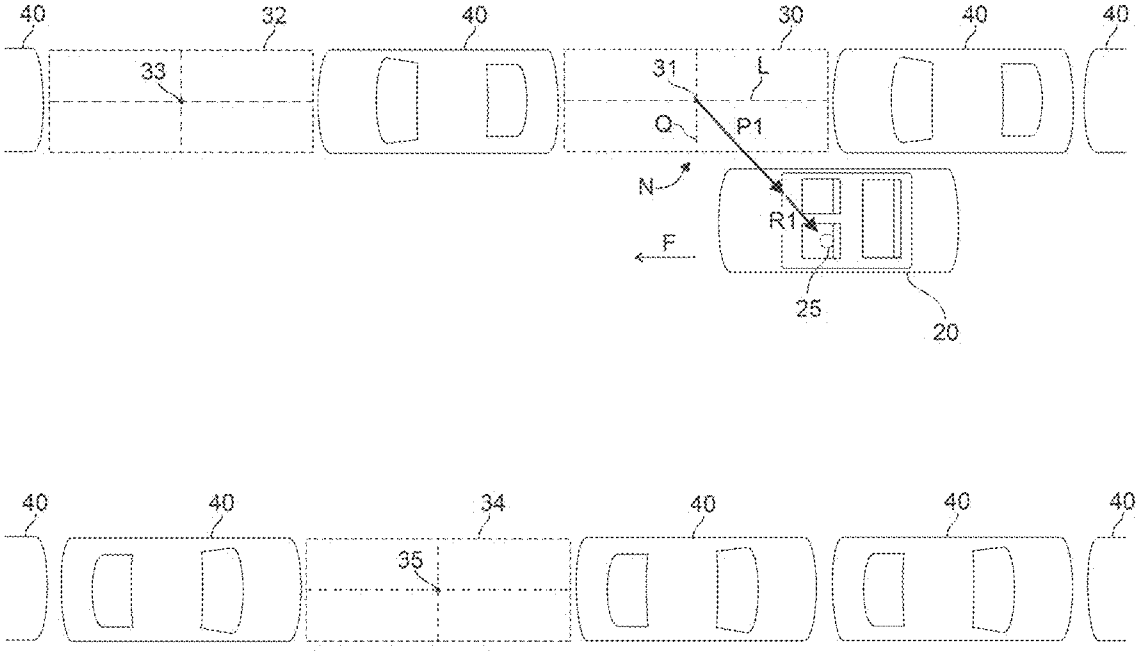
FIG. 2-4 show schematic plan views of the motor vehicle of FIG. 1 on a road with multiple parking spaces.
Figure 3:
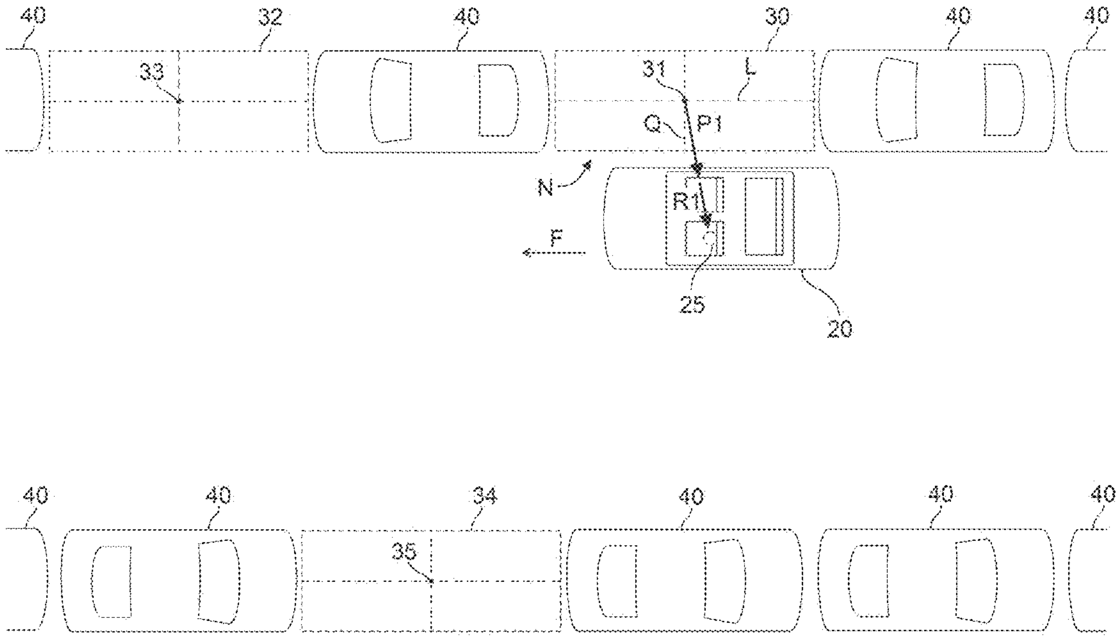
Figure 4:
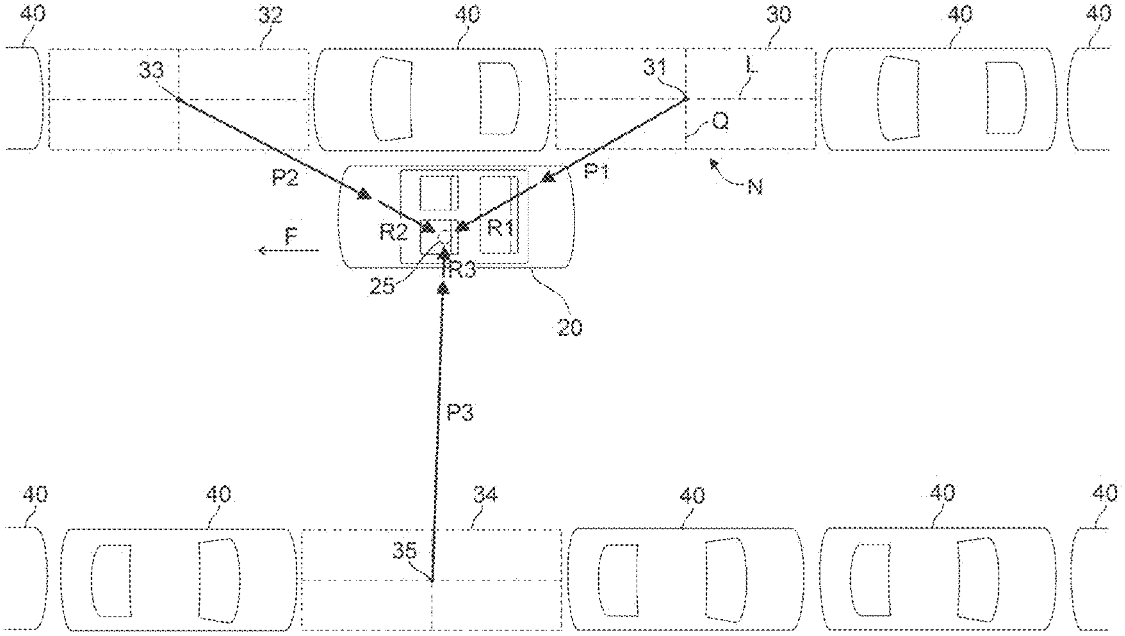

FIGS. 2 to 4 each show the motor vehicle 20 on a road with further vehicles 40 parked at the side, wherein a total of three parking spaces 30, 32, 34 are provided. In FIG. 2, in the direction of travel F, the parking space 30 is still slightly in front of the motor vehicle, which is approaching an approach side N of the parking space 30. As can be seen in FIGS. 2 to 4, a reference point 31, 33, 35 can be defined for each parking space 30, 32, 34, which reference point is arranged centrally in the respective parking space 30, 32, 34 in relation to a longitudinal direction L and a transverse direction Q. The control unit 10 defines the respective reference point 31, 33, 35 after it has found the parking space 30, 32, 34 and determined its dimensions. In FIGS. 2 and 3, this is only the case for the parking space 30. In FIGS. 2 to 7, the respective parking space direction P1, P2, P3 is determined in each case as the direction between the listening position 25 and the reference point 31, 33, 35. The respective parking space direction P1, P2, P3 is therefore associated with the respective reference point 31, 33, 35, i.e. that of the respective parking space 30, 32, 34, and it is possible to distinguish the respective direction of origin R1, R2 or R3. FIG. 3 shows a situation in which the motor vehicle 20 has been driven further forwards in the direction of travel F so that the parking space direction P1 has changed. This is registered by the control unit 10 and the direction of origin R1 is adjusted accordingly. To this end, the volume of the front left sound generator 6 is reduced, whilst that of the rear right generator 9 is increased. In FIG. 4, the motor vehicle 20 has been driven even further forwards so that the parking space 30 is located behind it to the right. Again, the direction of origin R1 associated with the parking space 30 in question is adjusted by reducing the volume of the front left sound generator 6 to zero, reducing the front right sound generator 7 and further increasing the volume of the rear right sound generator 9. If the parking space 32 and the parking space 34 have also been found and measured as indicated in FIG. 4, a parking space direction P2 and a parking space direction P3 are ascertained for these parking spaces. The acoustic signal A is accordingly enhanced, which means that a separate acoustic signal is generated for each parking space 30, 32, 34. If these acoustic signals are generated simultaneously, they are superimposed at each sound generator 6 to 9 in accordance with the volumes ascertained for the respective direction of origin R1, R2 or R3. Alternatively, the acoustic signals A corresponding to the individual parking spaces 30, 32, 34 may also be generated at alternating times.

Figure 5:
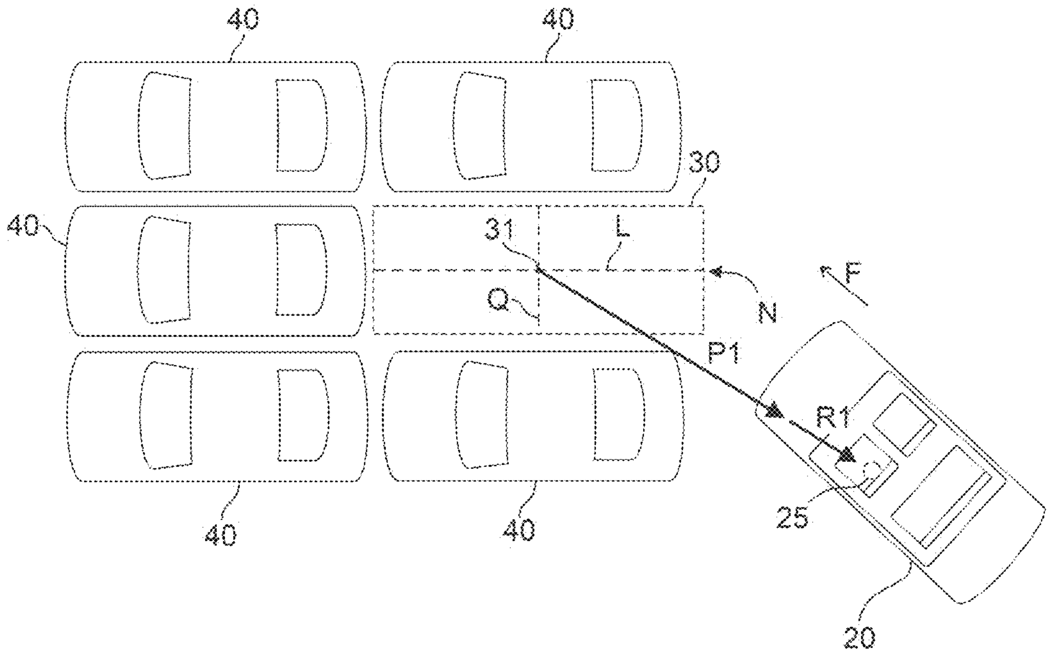
FIG. 5 shows a schematic plan view of the motor vehicle of FIG. 1 in a parking area with a parking space.

FIG. 5 shows a situation in a parking area, wherein there is, in turn, a parking space 30 between multiple vehicles 40. In this case, the approach side N is at the end relative to the longitudinal direction L, whilst, in FIGS. 2 to 4, it is at the side relative to the transverse direction Q. In particular, in a parking area having a plurality of parked vehicles 40, it may be difficult for the driver to find the parking space 30 or to keep an eye on it. The driver may also need to pay particular attention to pedestrians in the parking area. The acoustic, intuitively understandable indication of the parking space 30 is therefore particularly advantageous here.

Figure 6:
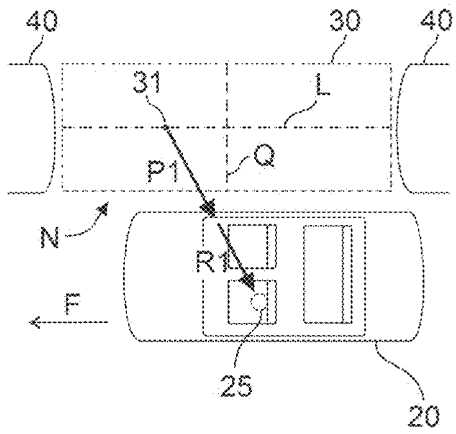
FIG. 6-7 show schematic plan views according to a detail of FIG. 2.
Figure 7:
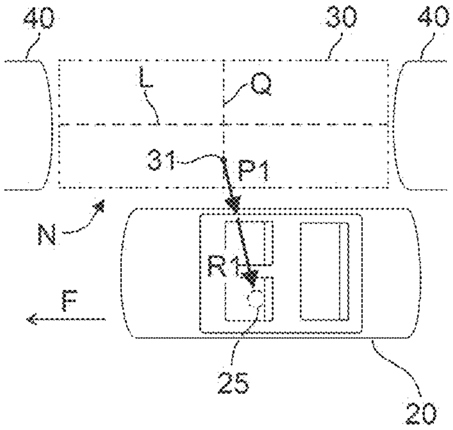

FIGS. 6 and 7 show examples in which the control unit 10 defines the reference point 31 in a different manner to that in FIGS. 2 to 5. In FIG. 6, the reference point 31 is shifted forwards in the direction of travel F relative to the longitudinal direction L. In FIG. 7, the reference point 31 is arranged centrally relative to the longitudinal direction L, but shifted towards the approach side N relative to the transverse direction Q.

LIST OF REFERENCE SIGNS

1 Assist system
2 Parking sensor arrangement
3 Parking sensor
5 Acoustic system
6-9 Sound generator
10 Control unit
20 Motor vehicle
21 Vehicle interior
22 Driver's seat
23 Passenger seat
24 Rear seat
25 Listening position
27 Interior sensor arrangement
30, 32, 34 Parking space
31, 33, 35 Reference point
40 Vehicle
A Acoustic signal
F Direction of travel
L Longitudinal direction
N Approach side
P1-P3 Parking space direction
Q Transverse direction R1-R3 Direction of origin
X Longitudinal axis
Y Transverse axis That which is claimed is:

1. An assist system (1) for a motor vehicle (20), comprising a parking sensor arrangement (2), an acoustic system (5) for a vehicle interior (21), and a control unit (10), wherein the control unit (10) is designed to detect at least one parking space (30, 32, 34) by the parking sensor arrangement (2), to indicate this parking space via an acoustic signal (A) by the acoustic system (5), and to determine a parking space direction (P1, P2, P3), and wherein the control unit (10) is designed to set a virtual direction of origin (R1, R2, R3) of the acoustic signal (A) that can be perceived in a listening position (25) within the vehicle interior (21), the virtual direction of origin being set relative to the listening position (25) and according to the parking space direction (P1, P2, P3).

2. The assist system according to claim 1, wherein the control unit (10) is designed to set the direction of origin (R1, R2, R3) in such a way that it deviates by a maximum of 45 from the parking space direction (P1, P2, P3).

3. The assist system according to claim 1, wherein the listening position (25) corresponds to an assumed driving position of a driver.

4. The assist system according to claim 1, wherein the acoustic system (5) has a multiplicity of sound generators (6, 7, 8, 9) and the control unit (10) is designed to set the direction of origin (R1, R2, R3) through individual adjustment of the output volume of the acoustic signal (A) at the individual sound generators (10).

5. The assist system according to claim 1, wherein the control unit (10) is designed to determine the listening position (25) by means of an interior sensor arrangement (27) associated with the vehicle interior (21).

6. The assist system according to claim 1, wherein the control unit (10) is designed to determine the parking space direction (P1, P2, P3) relative to the listening position (25).

7. The assist system according to claim 1, wherein the control unit (10) is designed to determine the parking space direction (P1, P2, P3) as a direction of a reference point (31, 33, 35) in the respective parking space (30, 32, 34) which is central in the respective parking space (30, 32, 34), shifted forwards relative to a direction of travel (F) of the motor vehicle (20) and/or shifted laterally to an approach side (N) of the motor vehicle (20).

8. The assist system according to claim 1, wherein the control unit (10) is designed to update the direction of origin (R1, R2, R3) upon a change in the parking space direction (P1, P2, P3).

9. The assist system according to claim 1, wherein the control unit (10) is designed to set the acoustic signal (A) according to a parking space distance.

10. The assist system according to claim 1, wherein the control unit (10) is designed to detect a multiplicity of parking spaces (30, 32, 34) and to indicate each parking space (30, 32, 34) via at least one acoustic signal (A).

* * * * *